Aug. 11, 1942.   W. RUSH   2,292,661
DOUGH FORMING APPARATUS FOR MAKING DOUGHNUTS, CAKES, COOKIES, AND ALL BATTER PRODUCTS
Filed June 6, 1940
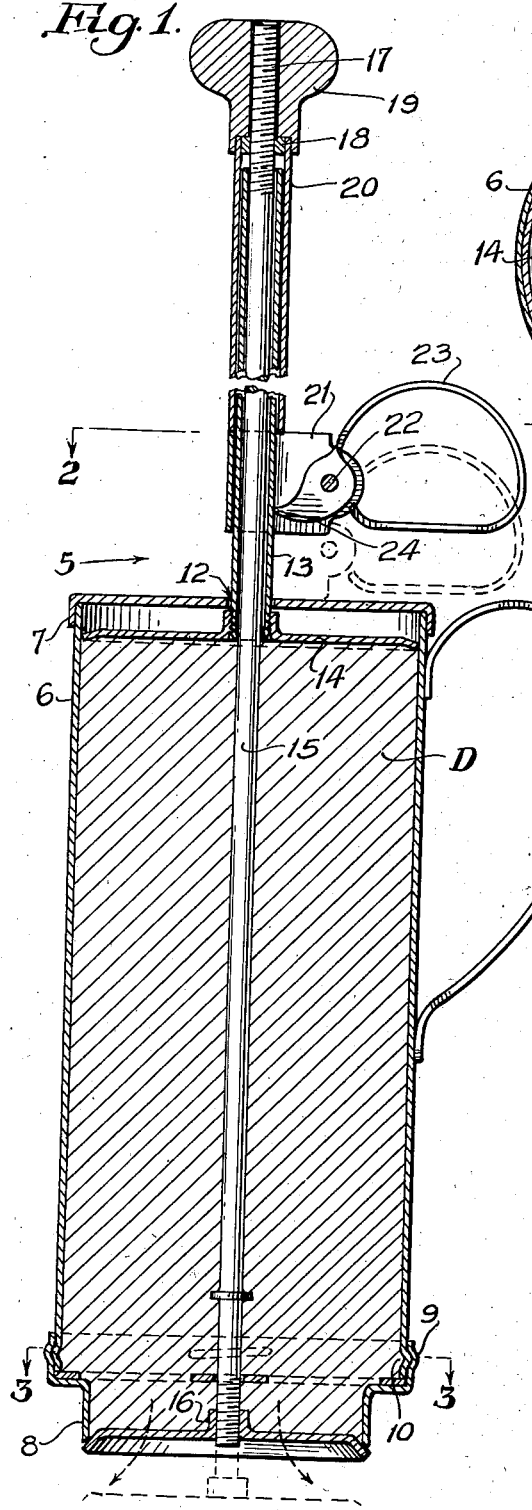
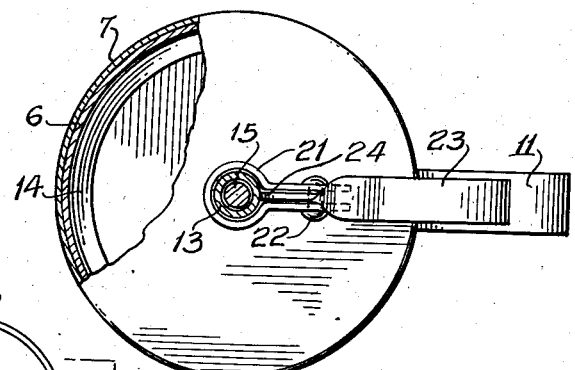
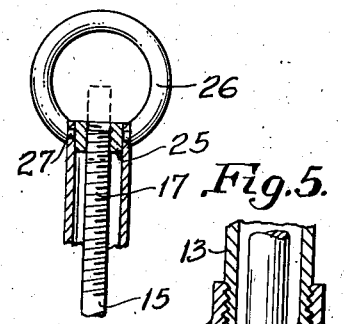
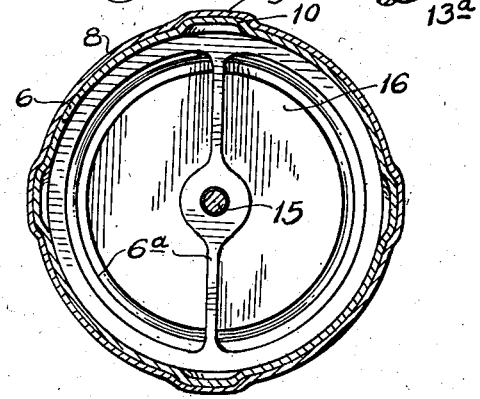
INVENTOR.
Ward Rush Patented Aug. 11, 1942

2,292,661

UNITED STATES PATENT OFFICE 2,292,661

DOUGH FORMING APPARATUS FOR MAKING DOUGHNUTS, CAKES, COOKIES, AND ALL BATTER PRODUCTS

Ward Rush, Los Angeles, Calif.

Application June 6, 1940, Serial No. 339,153

6 Claims. (Cl. 107—14)

My invention relates to an apparatus for forming cake doughnuts, cakes, pie fillings, etc.

One of the principal objects of this invention is to provide a doughnut forming apparatus whereby the batter doughnut may be formed and cut off at or any desired distance near the surface of the liquid in which it is to be fried or otherwise prepared.

An important object of this invention is the provision of an apparatus which may be easily manipulated by the operator to obtain definite quantities of formed dough.

Another important object of this invention is to provide an apparatus which may be readily dis-assembled and easily and quickly cleaned.

Another object of this invention is to provide an apparatus of this class which is very simple and economical of construction, durable and which will not readily deteriorate or get out of order.

Another object of this inveniton is to provide an apparatus or means whereby the operator of the apparatus is required to use only one hand to operate it.

With these and other objects in view as will hereinafter be described in detail and particularly set forth in the appended claims, reference being made to the accompanying drawing; to the characters of reference thereon which form a part of this application, in which;

Fig. 1 is a longitudinal sectional view of my doughnut making apparatus in a preferred form, the batter feed plunger being shown in a raised position, with the receptacle filled.

Fig. 2 is a transverse sectional view taken at 2—2 of Fig. 1; and,

Fig. 3 is another transverse sectional view taken at 3—3 of Fig. 1.

Fig. 4 is a longitudinal sectional view of a modified form of knob.

Fig. 5 is a longitudinal sectional view of plunger sleeve and feed rod showing the plunger sleeve peened to a sliding fit on the feed rod.

Referring more particularly to the drawing I show a dough forming apparatus 5 comprising a cylinder 6 for holding the batter, the cylinder having an upper cap 7 and a reducer cap 8 which has threads 9 for engagement with threads 10 on cylinder 6 to form a detachable connection therewith.

Cylinder 6 is provided with a handle 11 and cap 7 has an opening 12 through which a plunger sleeve 13 is reciprocable, the plunger sleeve having a plunger disc 14 secured at the lower end thereof within cylinder 6. A feed rod 15 extends through plunger sleeve 13 and an aperture in plunger disc 14, and a closure disc 16 is secured to the threaded end 17 of rod 15 and provides a closure for the annular opening of reducer cap 8. Rod 15 has a threaded upper end on which are positioned a nut 18 and a knob 19.

A spacer sleeve 20 at its upper end portion is secured to nut 18 by which it is adjustably secured on rod 15 and is of larger diameter than sleeve 13 so that sleeve 13 is reciprocable within sleeve 20.

A yoke 21 is positioned on sleeve 13 and is provided with a pivot pin 22 for an actuator grip 23 having a feed pawl 24 which engages plunger sleeve 13 and forces it downwardly by stepping action forcing the dough out through the opening of reducer cap 8. The upper end of spacer sleeve 20 may be provided with a modified form of knob comprising a ring 26 having swivel lugs 27 and a nut 25 secured to the spacer sleeve as shown in Fig. 4. The adjustment of the spacer sleeve on rod 15 by means of the nut 25 determines the limit of upward movement of the actuator grip when raising the plunger sleeve and plunger rod.

The apparatus Fig. 1 may be held and operated by one hand. This operation is obtained through placing the fingers in the handle and the thumb in the actuator grip 23 and pressing downward. This causes the feed pawl to grip plunger sleeve 13 and forces the plunger 14 downward through the cylinder 6 expelling the contents through the reducer cap 8. Raising the thumb with a slight pressure in the actuator grip 23 upwards, releases the grip on plunger sleeve 13 and frees the feed pawl 24 causes a contact of yoke 21 with spacer sleeve 20 thereby raising the closure disc 16 which contacts the reducing cap 8 cutting the batter or material which has been forced through the reducing cap 8 to a desired form.

Plunger sleeve 13 is peened at 13—a to a knife edge forming a sliding fit around rod 15 serving the purpose of keeping said rod 15 free of accumulations of batter.

Though I have shown and described a particular construction, I do not wish to be limited to the same, but desire to include in the scope of my invention, the construction, combination, and arrangement substantially as set forth in the appended claims.

I claim:

1. Dough forming apparatus as described comprising a receptacle having a discharge opening at its lower end and a cap at its upper end having an aperture, a reciprocable rod extending through said cap aperture, a cutter secured to said rod adjacent said discharge opening, a plunger sleeve slidably mounted on said rod and extending through said aperture, a plunger disk secured to said sleeve, a spacing sleeve secured to said rod adapted to receive said plunger sleeve, and an actuator adapted to engage and advance said plunger sleeve to discharge a quantity of dough through said opening.

2. Dough forming apparatus as described comprising a receptacle having a discharge opening at its lower end and a cap at its upper end having an aperture, a reciprocable rod extending through said cap aperture, a cutter secured to said rod adjacent said discharge opening, a plunger sleeve slidably mounted on said rod and extending through said aperture, a plunger disk secured to said sleeve within the receptacle, a spacing sleeve adjustably secured to said rod adapted to receive said plunger sleeve, and an actuator adapted to engage and advance said plunger sleeve to discharge a quantity of dough through said opening.

3. Dough forming apparatus as described comprising a receptacle having a discharge opening at its lower end and a cap at its upper end having an aperture, a reciprocable rod extending through said cap aperture, a cutter secured to said rod adjacent said discharge opening, a plunger sleeve slidably mounted on said rod and extending through said aperture, a plunger disk secured to said sleeve within the receptacle, a spacing sleeve adjustably secured to the upper end of said rod adapted to receive the upper end portion of said plunger sleeve, and an actuator adapted to engage and advance said plunger sleeve to discharge a quantity of dough through said opening.

4. Dough forming apparatus as described comprising a receptacle having a discharge opening at its lower end and a cap at its upper end having an aperture, a reciprocable rod extending through said cap aperture, a cutter secured to said rod adjacent said discharge opening, a plunger sleeve slidably mounted on said rod and extending through said aperture, a plunger disk secured to said sleeve within the receptacle, a spacing sleeve adjustably secured to the upper end of said rod adapted to receive the upper end portion of said plunger sleeve, and an actuator adapted to engage and advance said plunger sleeve to discharge a quantity of dough through said opening, said actuator including a yoke and a pawl member having a thumb aperture.

5. Dough forming apparatus as described comprising a receptacle having a discharge opening at its lower end and a cap at its upper end having an aperture, a reciprocable rod extending through said cap aperture, a cutter secured to said rod adjacent said discharge opening, a plunger sleeve slidably mounted on said rod and extending through said aperture, a plunger disk secured to said sleeve within the receptacle, a spacing sleeve adjustably secured to the upper end of said rod adapted to receive the upper end portion of said plunger sleeve, and an actuator adapted to engage and advance said plunger sleeve to discharge a quantity of dough through said opening, said actuator including a yoke slidably mounted on said plunger sleeve and a pawl, said spacing sleeve adapted to limit the movement of said actuator and said plunger.

6. Dough forming apparatus as described comprising a receptacle having a discharge opening at its lower end and a cap at its upper end having an aperture, a reciprocable rod extending through said cap aperture, a cutter secured to said rod adjacent said discharge opening, a plunger sleeve slidably mounted on said rod and extending through said aperture, a plunger disk secured to said sleeve, a spacing sleeve secured to said rod adapted to receive said plunger sleeve, and an actuator adapted to engage and advance said plunger sleeve to discharge a quantity of dough through said opening, said plunger sleeve being peened adjacent said plunger disk to a knife edge sliding fit with said rod to keep said rod free of accumulations of batter.

WARD RUSH.